United States Patent
Chen

(10) Patent No.: US 12,541,452 B2
(45) Date of Patent: Feb. 3, 2026

(54) MEMORY AND OPERATING METHOD THEREOF, MEMORY SYSTEM, COMPUTER-READABLE STORAGE MEDIUM

(71) Applicant: Yangtze Memory Technologies Co., Ltd., Hubei (CN)

(72) Inventor: Yonggang Chen, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 176 days.

(21) Appl. No.: 18/442,027

(22) Filed: Feb. 14, 2024

(65) Prior Publication Data

US 2025/0123960 A1    Apr. 17, 2025

(30) Foreign Application Priority Data

Oct. 12, 2023  (CN) .......................... 202311335976.X

(51) Int. Cl.
*G11C 16/26* (2006.01)
*G06F 12/02* (2006.01)

(52) U.S. Cl.
CPC ................................ *G06F 12/0246* (2013.01)

(58) Field of Classification Search
CPC ......... G06F 12/0246; G06F 2212/1032; G06F 2212/7206; G06F 2212/7208;
(Continued)

(56) References Cited

U.S. PATENT DOCUMENTS 10,163,518 B2 * 12/2018 Yoon .................. G11C 16/0458
10,937,508 B2 *  3/2021 Kim ..................... G06F 11/1048
(Continued)

FOREIGN PATENT DOCUMENTS

CN     110010184 A    7/2019
CN     110277132 A    9/2019
(Continued)

OTHER PUBLICATIONS

Office Action in Chinese Appln. No. 202311335976.X, mailed on Aug. 28, 2025, 16 pages (with English translation).

*Primary Examiner* — Jay W. Radke
(74) *Attorney, Agent, or Firm* — Fish & Richardson P.C.

(57) ABSTRACT

A memory includes an array of memory cells and a peripheral circuit. A memory cell is configured to store N bits of data, and a plurality of memory cells has $2^N$ data states. The peripheral circuit is configured to: read the array of memory cells with a first read voltage and determine a first number of memory cells with a threshold voltage greater than the first read voltage that is greater than a first initial threshold voltage; read the array of memory cells with a second read voltage and determine a second number of memory cells with a threshold voltage greater than the second read voltage that is greater than a second initial threshold voltage and less than the first initial threshold voltage; determine a valley position of distribution interval of threshold voltages for a $2^N$-th data state based on a difference between the second number and the first number.

20 Claims, 13 Drawing Sheets

(58) Field of Classification Search
CPC ..... G11C 11/5642; G11C 16/20; G11C 16/26; G11C 29/021; G11C 29/028; G11C 16/0483
See application file for complete search history.

(56) References Cited

U.S. PATENT DOCUMENTS

| | | | |
|---|---|---|---|
| 11,238,942 B2 * | 2/2022 | Kim | ................ H01L 24/94 |
| 12,189,965 B2 * | 1/2025 | Ahn | ................ G11C 16/0483 |
| 2013/0194883 A1 | 8/2013 | Lee | |
| 2019/0287629 A1 * | 9/2019 | Bang | ................ G06F 3/0688 |

FOREIGN PATENT DOCUMENTS

| | | |
|---|---|---|
| CN | 112614529 A | 4/2021 |
| CN | 115083489 A | 9/2022 |
| CN | 115223637 A | 10/2022 |
| KR | 20200139044 A | 12/2020 |

* cited by examiner

MEMORY AND OPERATING METHOD THEREOF, MEMORY SYSTEM, COMPUTER-READABLE STORAGE MEDIUM

CROSS-REFERENCE TO RELATED APPLICATIONS

This application claims the benefit of priority to Chinese Patent Application No. CN202311335976.X, filed on Oct. 12, 2023, the disclosure of which is hereby incorporated by reference in its entirety.

FIELD OF TECHNOLOGY

Examples of the present disclosure relate to the field of semiconductor technology, and relate to but are not limited to memory and operating method thereof, memory system, and computer-readable storage medium.

BACKGROUND

NAND memory has developed from Single-Level Cell (abbreviated as SLC) and Multi-Level Cell (abbreviated as MLC) to Trinary-Level Cell (abbreviated as TLC) and even Quad-Level Cell (abbreviated as QLC), and the number of stacked layers has also increased from 32 to 64, 128, 256 or even more.

As the integration level and bit density of a NAND memory increase, the bit error rate of data increases, and reliability issue of the data becomes more and more significant. In order to enhance the reliability of data, Low Density Parity Code (LDPC) technology with a stronger error correction capability is employed to ensure that data may be written or read correctly.

SUMMARY

The present disclosure provides a memory and operating method thereof, a memory system and a computer-readable storage medium.

According to a first aspect of an example of the present disclosure, a memory is provided. The memory includes: an array of memory cells, wherein the array of memory cells includes a plurality of memory cells, a memory cell is configured to store N bits of data, the plurality of memory cells have $2^N$ data states, and N is an integer greater than or equal to 1; and a peripheral circuit coupled to the array of memory cells. The peripheral circuit is configured to: read the array of memory cells with a first read voltage, and determine a first number of memory cells with a threshold voltage greater than the first read voltage; wherein the first read voltage is greater than a first initial threshold voltage for the $2^N$-th data state; read the array of memory cells with a second read voltage, and determine a second number of memory cells with a threshold voltage greater than the second read voltage; wherein the second read voltage is greater than a second initial threshold voltage for a ($2^N$-1)-th data state and less than the first initial threshold voltage; determine a valley position of distribution interval of threshold voltages for the $2^N$-th data state based on a difference between the second number and the first number.

In some examples, the peripheral circuit is configured to: determine the difference between the second number and the first number; determine whether the difference is substantially equal to a preset value; wherein the preset value is a number of memory cells in the $2^N$-th data state; when the difference is substantially equal to the preset value, determine that the valley position is between the second read voltage and the first initial threshold voltage.

In some examples, the peripheral circuit is configured to: when the difference is less than the preset value, determine that the valley position is between the second initial threshold voltage and the second read voltage.

In some examples, the peripheral circuit is further configured to: when the difference is less than the preset value, read the array of memory cells with at least one offset read voltage until a difference between the number of memory cells with a threshold voltage greater than the offset read voltage and the first number is substantially equal to the preset value; wherein the offset read voltage offsets relative to the second read voltage, and the offset read voltage is greater than the second initial threshold voltage and less than the second read voltage.

In some examples, the at least one offset read voltage includes a first offset read voltage and a second offset read voltage, the second offset read voltage is less than the first offset read voltage; and the peripheral circuit is further configured to: generate the first offset read voltage based on the second read voltage; wherein the first offset read voltage has a first offset relative to the second read voltage; generate the second offset read voltage based on the first offset read voltage; wherein, the second offset read voltage has a second offset relative to the first offset read voltage, and the second offset is less than or equal to the first offset.

In some examples, the number of memory cells in the $2^N$-th data state includes a ratio of a total number of the plurality of memory cells and $2^N$.

In some examples, the peripheral circuit is further configured to: determine an optimal read voltage that distinguishes the ($2^N$-1)-th data state from the $2^N$-th data state based on the valley position.

In some examples, the peripheral circuit is further configured to: perform a write operation on the array of memory cells, so that a plurality of memory cells have the $2^N$ data states; determine the first initial threshold voltage and the second initial threshold voltage based on the $2^N$ data states.

In some examples, the memory includes a flash memory.

According to a second aspect of an example of the present disclosure, a method for operating a memory is provided. The method includes: reading an array of memory cells with a first read voltage, and determining a first number of memory cells with a threshold voltage greater than the first read voltage; wherein the array of memory cells includes a plurality of memory cells, a memory cell is configured to store N bits of data, the plurality of memory cells have $2^N$ data states, and N is an integer greater than or equal to 1; the first read voltage is greater than a first initial threshold voltage for the $2^N$-th data state;

reading the array of memory cells with a second read voltage, and determine a second number of memory cells with a threshold voltage greater than the second read voltage; wherein the second read voltage is greater than a second initial threshold voltage for a ($2^N$-1)-th data state and less than the first initial threshold voltage; determining a valley position of distribution interval of threshold voltages for the $2^N$-th data state based on the difference between the second number and the first number.

In some examples, the determining a valley position of distribution interval of threshold voltages for the $2^N$-th data state based on the difference between the second number and the first number includes: determining the difference between the second number and the first number; determining whether the difference is substantially equal to a preset value; wherein the preset value is the number of memory cells in the $2^N$-th data state; when the difference is substantially equal to the preset value, determining that the valley position is between the second read voltage and the first initial threshold voltage.

In some examples, when the difference is less than the preset value, determine that the valley position is between the second initial threshold voltage and the second read voltage.

In some examples, the method further includes: when the difference is less than the preset value, reading the array of memory cells with at least one offset read voltage until a difference between the number of memory cells with a threshold voltage greater than the offset read voltage and the first number is substantially equal to the preset value; wherein the offset read voltage offsets relative to the second read voltage, and the offset read voltage is greater than the second initial threshold voltage and less than the second read voltage.

In some examples, the at least one offset read voltage includes a first offset read voltage and a second offset read voltage, the second offset read voltage is less than the first offset read voltage; and the method further includes: generating the first offset read voltage based on the second read voltage; wherein the first offset read voltage has a first offset relative to the second read voltage; generating the second offset read voltage based on the first offset read voltage; wherein, the second offset read voltage has a second offset relative to the first offset read voltage, and the second offset is less than or equal to the first offset.

In some examples, the number of memory cells in the $2^N$-th data state includes a ratio of a total number of the plurality of memory cells and $2^N$.

In some examples, the method further includes: determining the optimal read voltage that distinguishes the $(2^N-1)$-th data state from the $2^N$-th data state based on the valley position.

In some examples, the method further includes: performing a write operation on the array of memory cells, so that a plurality of memory cells have the $2^N$ data states; determining the first initial threshold voltage and the second initial threshold voltage based on the $2^N$ data states.

According to a third aspect of an example of the present disclosure, a memory system is provided. The method includes: one or more memories of any example in the first aspect of the examples of the present disclosure; and a memory controller coupled to the one or more memories and configured to control the one or more memories.

According to a fourth aspect of an example of the present disclosure, a computer-readable storage medium is provided, instructions are stored on the computer-readable storage medium, and the instructions, when executed, implement the operating method of any one of the examples in the second aspect of examples of the present disclosure.

The details of one or more implementations of the subject matter of this present disclosure are set forth in the accompanying drawings and the description below. Other features, aspects, and advantages of the subject matter will become apparent from the description, the drawings, and the claims.

BRIEF DESCRIPTION OF THE DRAWINGS

In the accompanying drawings, unless otherwise specified, same reference numbers refer to same or similar parts or elements throughout multiple accompanying drawings. The accompanying drawings are not necessarily to scale. It should be understood that these accompanying drawings depict only some examples disclosed in accordance with the present application and should not be considered as limiting the scope of the present application.

DETAILED DESCRIPTION

Figure 1:
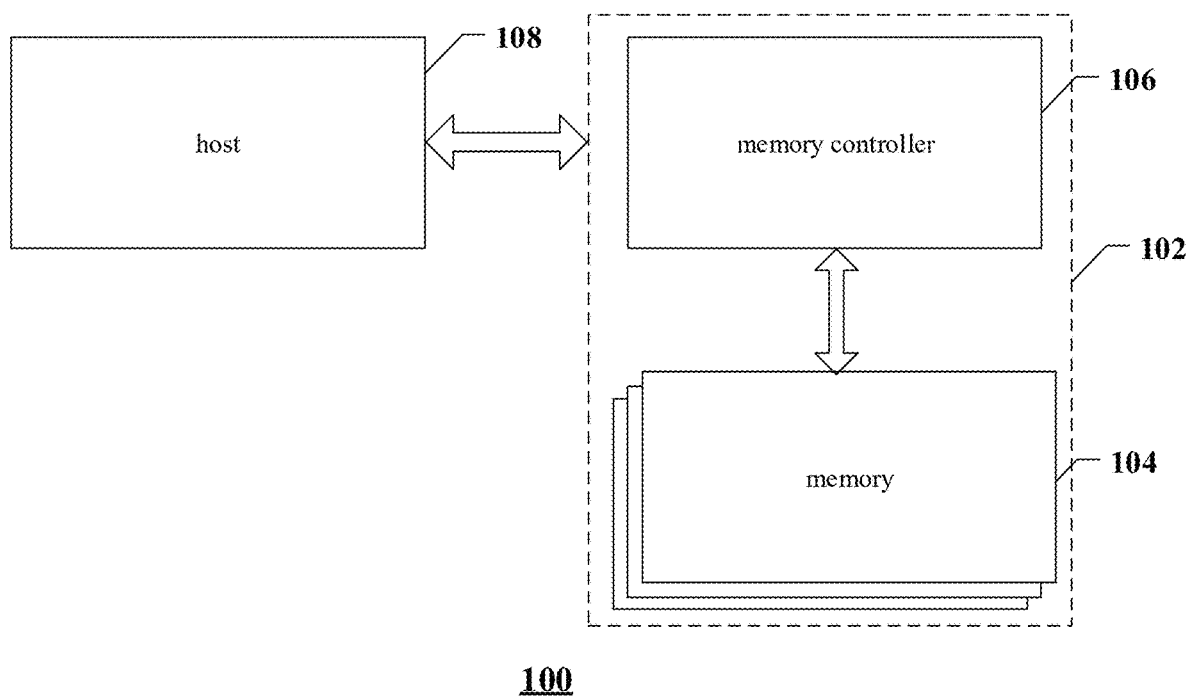
FIG. 1 is a schematic diagram of a system shown according to an example of the present disclosure.

Implementations of the present disclosure provide operation methods of memories. In some implementations, an array of memory cells is read with a first read voltage, and a first number of memory cells with a threshold voltage greater than the first read voltage is determined. The array of memory cells is read with a second read voltage, and a second number of memory cells with a threshold voltage greater than the second read voltage is determined. A valley position of distribution interval of threshold voltages for the $2^N$-th data state is determined based on a difference between the second number and the first number. In a first aspect, the valley position for the $2^N$ data state may be quickly found, thereby reducing the number of adjustments to the read voltage and in turn reducing the read time. In a second aspect, the probability of errors may be reduced and the error correction capability of LDPC may be improved.

To facilitate understanding of the present disclosure, illustrated examples of the present disclosure will be described in more detail below with reference to the relevant accompanying drawings. Although illustrated implementations of the present disclosure are shown in the accompanying drawings, it should be understood that the present disclosure may be implemented in various forms and should not be limited to the implementations set forth herein. Rather, these examples are provided so that the present disclosure can be more thoroughly understood and the scope of the present disclosure can be fully conveyed to those skilled in the art.

In the following description, numerous details are given in order to provide a more thorough understanding of the present disclosure. However, it will be apparent to one skilled in the art that the present disclosure may be practiced without one or more of these details. In some examples, in order to avoid confusion with the present disclosure, some technical features known in the art are not described; that is, not all features of the actual example may be described here, and well-known functions and structures may be not described in detail.

Generally, a term may be understood, at least in part, from context of use. For example, depending at least in part on context, the term "one or more" as used herein may be used in the singular to describe any feature, structure or characteristic, or may be used in the plural to describe a combination of features, structures or characteristics. Similarly, terms such as "a" or "the" may equally be understood to convey a singular usage or to convey a plural usage, depending at least in part on the context. Additionally, the term "based on" may be understood as not necessarily intended to convey an exclusive set of factors, and may alternatively allow for the presence of additional factors that are not necessarily explicitly described, which again depends at least in part on context.

Unless otherwise defined, the terminology used herein is for the purpose of describing a particular example only and is not to be considered as limitation of the present disclosure. As used herein, the singular forms "a", "an" and "said/the" are intended to include the plural forms as well, unless the context clearly dictates otherwise. It should also be understood that the terms "consists of" and/or "comprising", when used in this description, identify the presence of stated features, integers, operations, operations, elements and/or parts, but do not exclude the presence or addition of one or more other features, integers, operations, operations, elements, parts and/or groups. As used herein, the term "and/or" includes any and all combinations of the associated listed items.

In order to thoroughly understand the present disclosure, detailed operations and detailed structures will be provided in the following description, so as to explain the technical solution of the present disclosure. Preferred examples of the present disclosure are described in detail as follows, however, the present disclosure may have other examples other than these detailed descriptions.

FIG. 1 is a schematic diagram of a system 100 shown according to an example of the present disclosure. The system 100 may be a mobile phone, a desktop computer, a laptop computer, a tablet, a vehicle computer, a gaming console, a printer, a positioning device, a wearable electronic device, a smart sensor, a Virtual Reality (VR) device, an Augmented Reality (AR) device, or any other suitable electronic devices having memory therein. As shown in in FIG. 1, system 100 may include a host 108 and a memory system 102, and the memory system 102 has one or more memories 104 and a memory controller 106. The host 108 may be a processor of an electronic device (e.g., a Central Processing Unit (CPU)) or a System on Chip (SoC) (e.g., an Application Processor (AP)). Host 108 may be configured to send data to or receive data from memory 104.

The memory controller 106 is coupled to the memory 104 and the host 108 and is configured to control the memory 104. The memory controller 106 may manage data stored in the memory 104 and communicate with the host 108. In some implementations, the memory controller 106 is designed to operate in low duty cycle environments, e.g., Secure Digital Memory Card (SD Card), Compact Flash Card (CF Card), Universal Serial Bus (USB) flash drive, or other medium for use in electronic devices such as personal computer, digital camera, mobile phone, etc. In some implementations, the memory controller 106 is designed to operate in high duty cycle environment Solid State Drive (SSD) or Embedded Multi Medium Card (eMMC), where SSD or eMMC is used as data storage for mobile devices such as smartphone, tablet computer, laptop computer, and enterprise storage array.

Memory controller 106 may be configured to control operations of memory 104, e.g., read, erase and write operations. Memory controller 106 may also be configured to manage various functions related to data stored or to be stored in memory 104, including but not limited to bad block management, garbage collection, logical-to-physical address translation, wear leveling, etc. In some implementations, the memory controller 106 is further configured to process Error Correction Code (ECC) related to data read from or written to memory 104. Memory controller 106 may also perform any other suitable functions, e.g., formatting memory 104. Memory controller 106 may communicate with a host (e.g., host 108) according to a particular communication protocol. For example, memory controller 106 may communicate with a host through at least one of various interface protocols, such as USB protocol, MMC protocol, Peripheral Component Interconnect (PCI) protocol, Peripheral Component Interconnect Express (PCI-E) protocol, Advanced Technology Attachment (ATA) protocol, Serial ATA protocol, Parallel ATA protocol, Small Computer System Interface (SCSI) protocol, Enhanced System Device Interface (ESDI) protocol, Integrated Drive Electronics (IDE) protocol, Firewire protocol, etc.

Figure 2A:
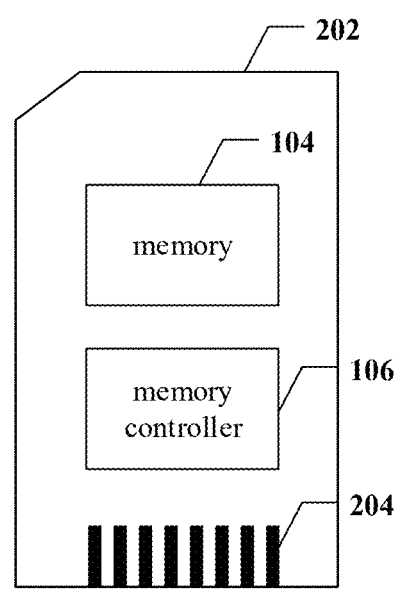
FIG. 2a is a schematic diagram of a memory card shown according to an example of the present disclosure.
Figure 2B:
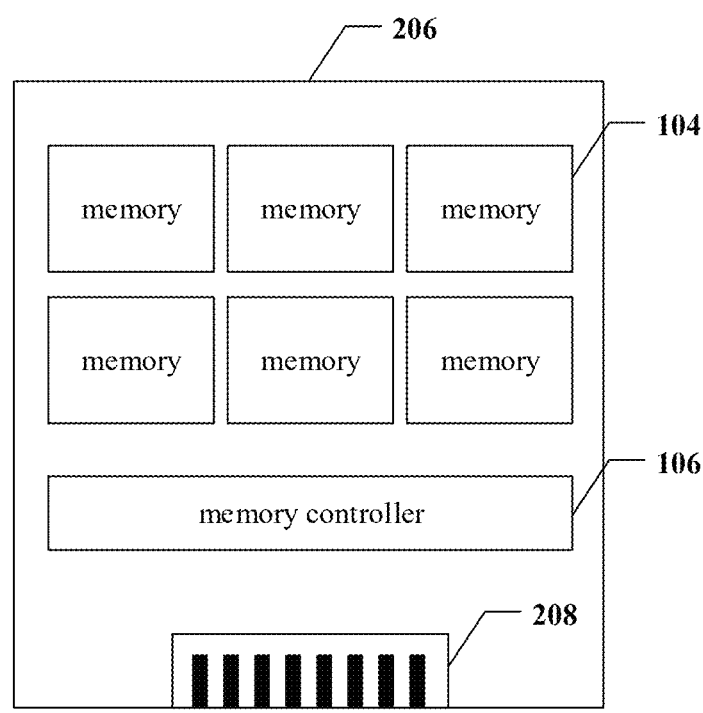
FIG. 2b is a schematic diagram of a solid state drive shown according to an example of the present disclosure.

The memory controller 106 and one or more memories 104 may be integrated into various types of storage devices, e.g., included in the same package (e.g., Universal Flash Storage package or eMMC package). That is, memory system 102 may be implemented and packaged into different types of end electronic products. In one example as shown in FIG. 2a, memory controller 106 and a single memory 104 may be integrated into a memory card 202. A memory card 202 may include a PC card (Personal Computer Memory Card International Association, PCMCIA), a CF card, a Smart Medium (SM) card, a memory stick, a Multi Medium Card (MMC), Reduced-Size MMC (RS-MMC), Multi Medium Card Micro (MMCmicro), SD card (SD, miniSD, microSD, SDHC), Univeral Flash Storage (UFS), etc. The memory card 202 may further include a memory card connector 24 coupling memory card 202 with a host (e.g., host 108 in FIG. 1). In another example as shown in FIG. 2b, memory controller 106 and multiple memories 104 may be integrated into a SSD 206. SSD 27 may further include an SSD connector 208 coupling SSD 206 with a host (e.g., host 108 in FIG. 1). In some implementations, the storage capacity and/or operating speed of SSD 206 is greater than the storage capacity and/or operating speed of memory card 202. The memory 104 may include volatile memory and non-volatile memory, e.g., NAND flash memory, dynamic random access memory, ferroelectric random access memory, magnetic random access memory, phase change random access memory, resistive random access memory, nanorandom access memory, etc.

Figure 3:
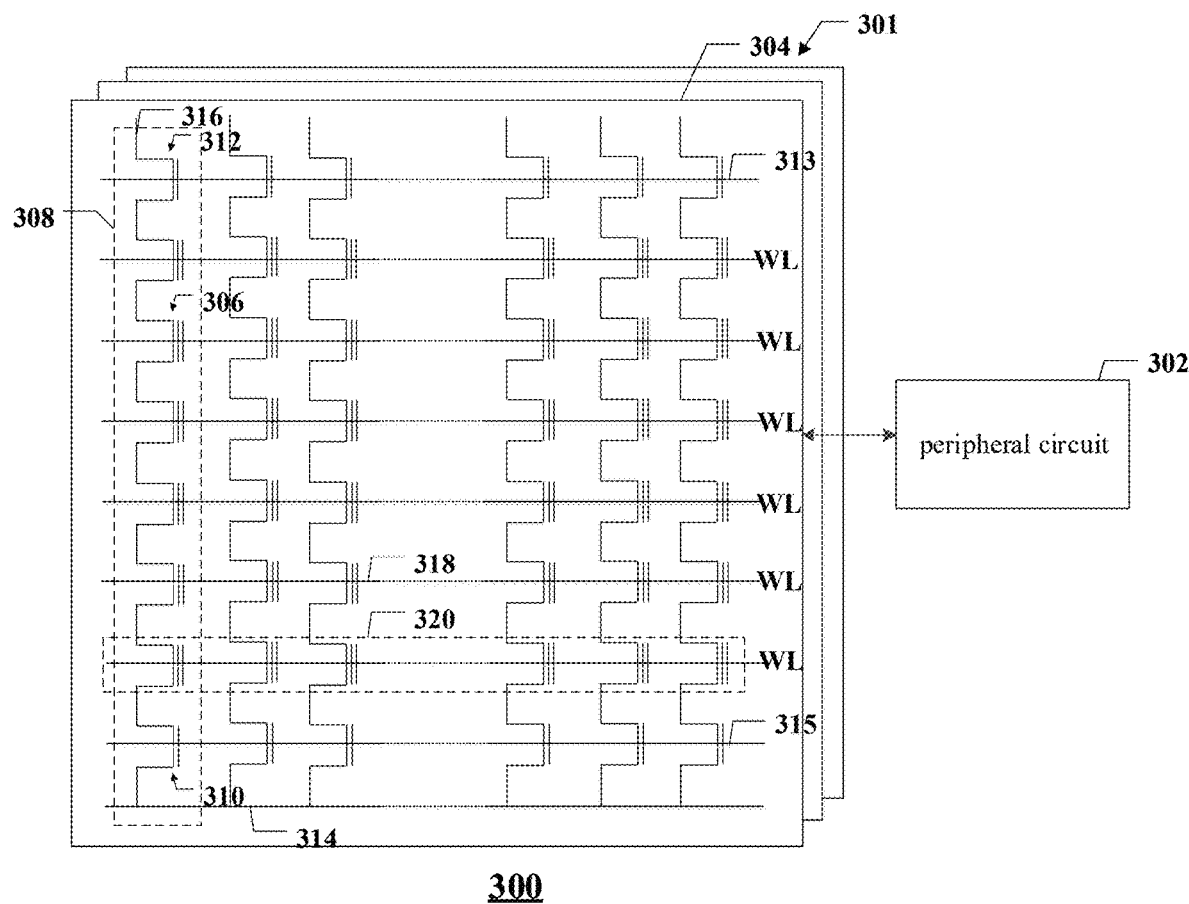
FIG. 3 is a schematic structural diagram of a memory shown according to an example of the present disclosure.

FIG. 3 is a schematic structural diagram of a memory 300 shown according to an example of the present disclosure, the memory 300 may be an example of the memory 104 in FIG.

1. Referring to FIG. 3, memory 300 includes an array of memory cells 301 and a peripheral circuit 302 coupled to the array of memory cells 301. Taking the array of memory cells 301 being a 3D NAND memory cell array as an example for illustration, where memory cells 306 is a NAND memory cell, and memory cells 306 are provided in the form of an array of memory strings 308, each memory string 308 extending vertically over a substrate (not shown). In some implementations, each memory string 308 includes a plurality of memory cells 306 coupled in series and stacked vertically. Each memory cell 306 may retain a continuous analog value, e.g., voltage or charge, depending on the number of electrons trapped within the area of the memory cell 306. Each memory cell 306 may be a "floating gate" type memory cell including a floating gate transistor, or a "charge trap" type memory cell including a charge trap transistor.

As shown in FIG. 3, each memory string 308 may include a Bottom Selected Transistor (BST) 310 at its source terminal and a Top Selected Transistor (TST) 312 at its drain terminal. The Bottom Selected Transistor 310 and Top Selected Transistor 312 may be configured to activate the selected string 308 during read operation and write operation. In some implementations, sources of the memory string 308 in a same memory block 304 are coupled through a same Source Line (SL) 314 (e.g., a common source line). In other words, according to some implementations, all memory strings 308 in a same memory block 304 have an Array Common Source (ACS). According to some implementations, the top selected transistor 312 of each memory string 308 is coupled to a corresponding Bit Line (BL) 316 from which data may be read or written via an output bus (not shown). In some implementations, each memory string 308 is configured to be selected or deselected through a selection voltage (e.g., a voltage higher than the threshold voltage for the top selected transistor 312) or a deselection voltage (e.g., 0V) being applied to the corresponding top selected transistor 312 via one or more top selected lines (TSL) and/or a selection voltage (e.g., a voltage higher than the threshold voltage for the bottom selected transistor 310) or a deselection voltage (e.g., 0V) being applied to the corresponding bottom selected transistor 310 via one or more bottom selected lines (BSL) 315.

As also shown in FIG. 3, a memory string 308 may be organized into a plurality of memory blocks 304 each of which may have a common source line 314 (e.g., coupled to the ground). In some implementations, each memory block 304 is the basic data unit for an erase operation, i.e., all memory cells 306 on the same memory block 304 are erased simultaneously. To erase the memory cell 306 in the selected memory block, source line 314 coupled to selected memory block and to unselected memory blocks in the same plane as selected memory block may be biased with an erase voltage (Vers) (e.g., a high positive voltage (e.g., 20V or higher)). It should be understood that, in some examples, erase operations may be performed at the half-memory block level, at the quarter-memory block level, or at a level with any suitable number of memory blocks or any suitable fraction of memory blocks. The memory cells 306 of adjacent memory strings 308 may be coupled through a word line 318 that selects which row of memory cells 306 is affected by read and program operations. In some implementations, each word line 318 is coupled to a memory page 320 of the memory cell 306. The size of one memory page 320 in bits may be related to the number of memory strings 308 coupled through word line 318 in a memory block 304. Each word line 318 may include a plurality of control gates (gate electrodes) at each memory cell 306 in a corresponding memory page 320 and a gate line coupling the control gates.

Figure 4:
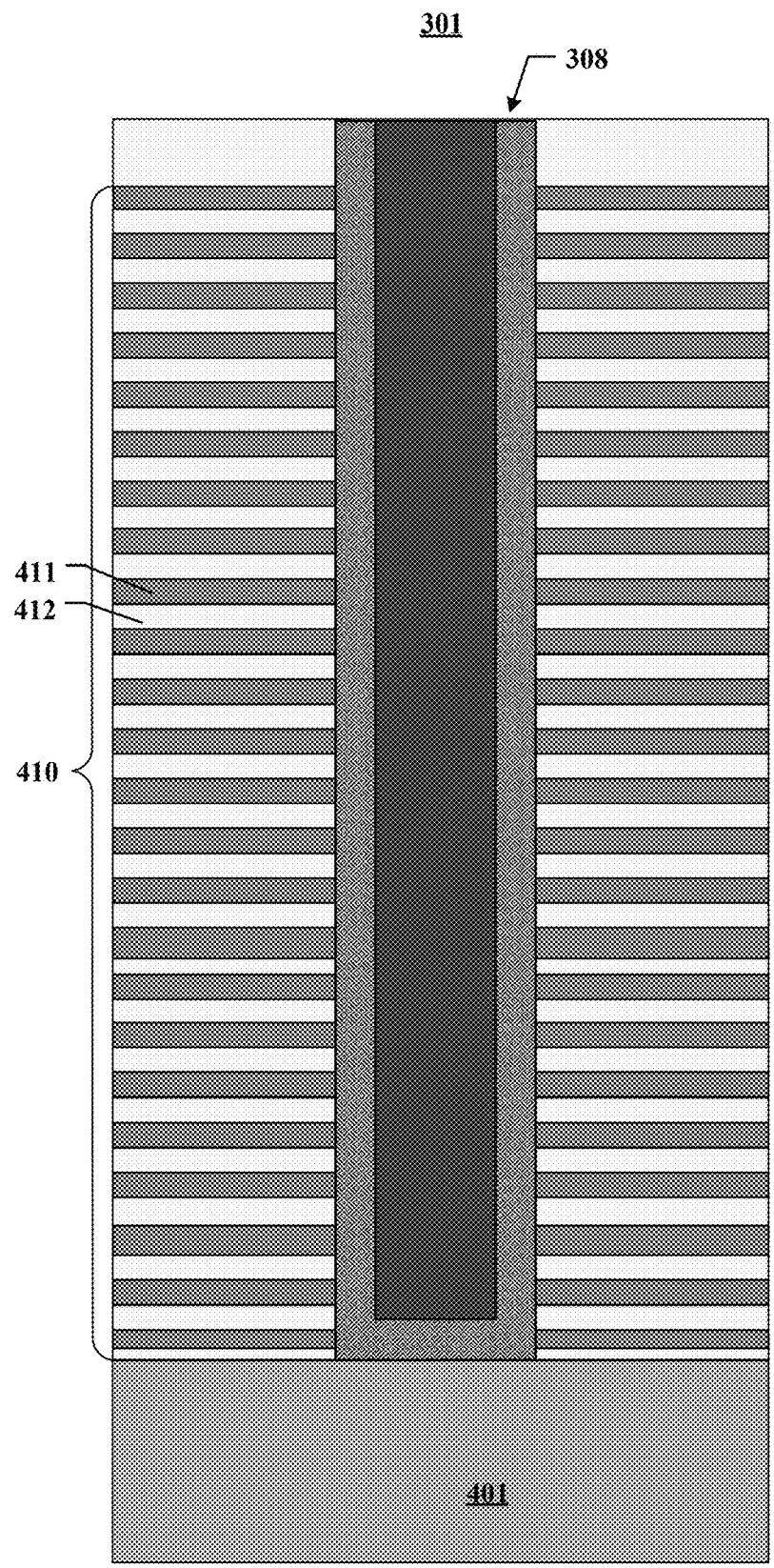
FIG. 4 is a schematic cross-sectional view of an array of memory cells shown according to an example of the present disclosure.

FIG. 4 is a schematic cross-sectional view of an array of memory cells 301 shown according to an example of the present disclosure. Referring to FIG. 4, the memory string 308 may include a stacked structure 410, the stacked structure 410 includes a plurality of gate layers 411 and a plurality of insulating layers 412 alternately stacked in sequence, and memory string 308 vertically penetrating through gate layers 411 and insulating layers 412. Gate layers 411 and the insulating layers 412 may be stacked alternately, and two adjacent gate layers 411 are separated by an insulating layer 412. The number of memory cells included in the array of memory cells is mainly related to the number of pairs of gate layers 411 and insulating layers 412 in the stacked structure 410.

A constituent material of the gate layer 411 may include a conductive material. Conductive materials include, but are not limited to, tungsten (W), cobalt (Co), copper (Cu), aluminum (Al), polysilicon, doped silicon, silicide, or any combination thereof. In some examples, each gate layer 411 includes a metal layer, e.g., a tungsten layer. In some examples, each gate layer 411 includes a doped polysilicon layer. Each gate layer 411 may include a control gate surrounding a memory cell. A gate layer 411 at the top of a stacked structure 410 may extend laterally as a top selected gate line, a gate layer 411 at the bottom of a stacked structure 410 may extend laterally as a bottom selected gate line, and a gate layer 411 extending laterally between a top selected gate line and a bottom selected gate line may serve as a word line.

In some examples, a stacked structure 410 may be disposed on a substrate 401. The substrate 401 may include silicon (e.g., monocrystalline silicon), silicon germanium (SiGe), gallium arsenide (GaAs), germanium (Ge), silicon-on-insulator (SOI), germanium-on-insulator (GOI), or any other appropriate material.

In some examples, a memory string 308 includes a channel structure extending vertically through stacked structure 410. In some implementations, a channel structure includes a channel hole filled with semiconductor material(s) (e.g., as a semiconductor channel) and dielectric material(s) (e.g., as a memory film). In some implementations, a semiconductor channel includes silicon, e.g., polysilicon. In some implementations, a memory film is a composite dielectric layer including a tunneling layer, a storage layer (also referred to as a "charge trapping"), and a blocking layer. A channel structure may have a cylindrical shape. According to some implementations, a semiconductor channel, a tunneling layer, a storage layer and a blocking layer are radially arranged in this order from the center of the pillar toward the outer surface of the pillar. A tunneling layer may include silicon oxide, silicon oxynitride, or any combination thereof. A storage layer may include silicon nitride, silicon oxynitride, or any combination thereof. A barrier layer may include silicon oxide, silicon oxynitride, a high-k (high-k) dielectric, or any combination thereof. In an example, a memory film may include a composite layer of silicon oxide/silicon nitride/silicon oxide (ONO).

Figure 5:
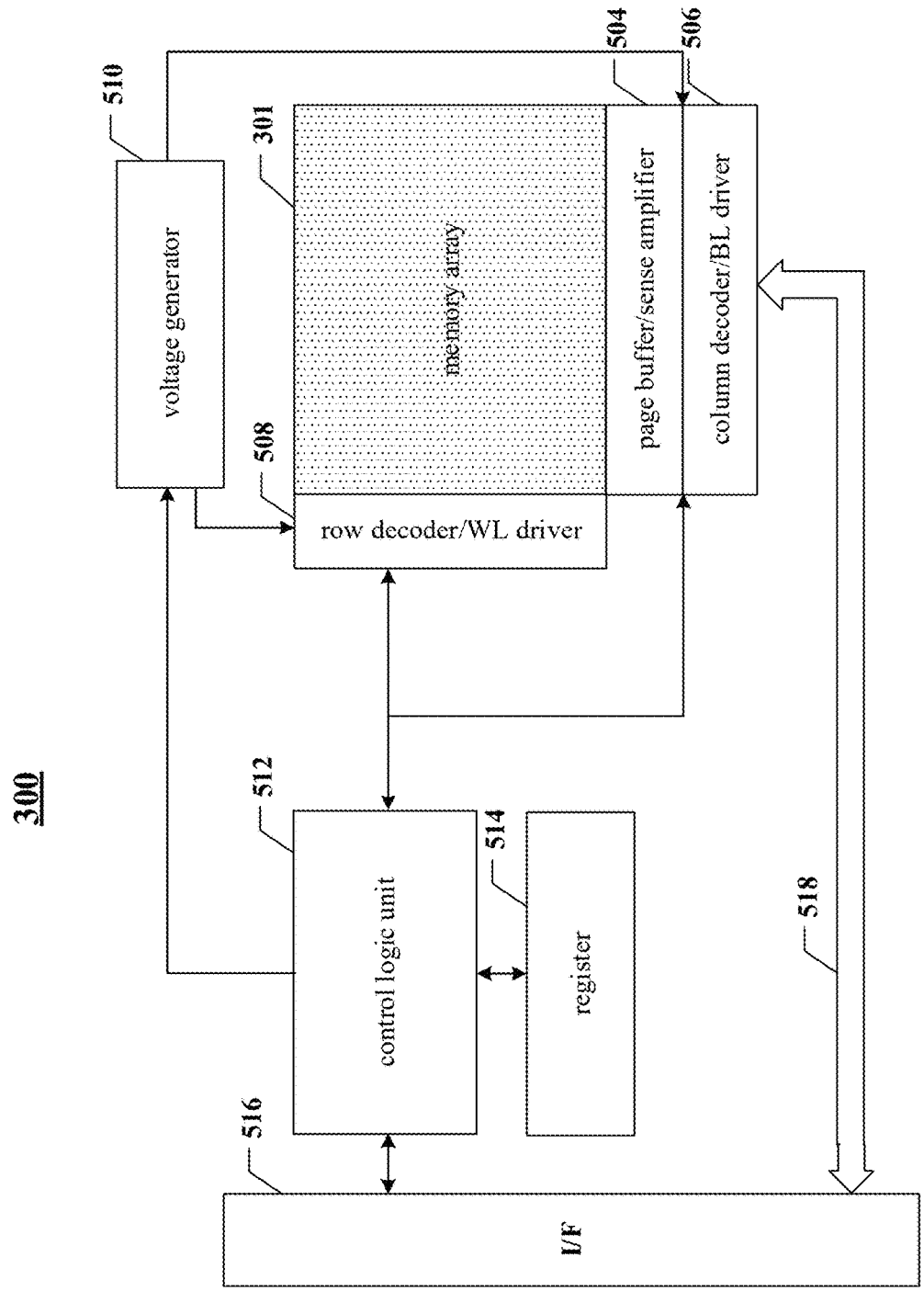
FIG. 5 is a schematic diagram of a peripheral circuit of a memory shown according to an example of the present disclosure.

Referring back to FIG. 3, the peripheral circuit 302 may be coupled to the array of memory cells 301 through bit line 316, word line 318, source line 314, bottom selected line 315, and top selected line 313. The peripheral circuit 302 may include any suitable analog, digital, and mixed-signal circuit for facilitating operation of the array of memory cells 301 through applying a voltage signal and/or a current signal to and sensing voltage signal and/or current signal from each target memory cell 306 via bit line 316, word line 318, source line 314, bottom selected line 315, and top selected line 313. The peripheral circuit 302 may include various types of peripheral circuits formed with metal-oxide-semiconductor technology. For example, FIG. 5 illustrates some illustrated peripheral circuits, peripheral circuit 302 includes page buffer/sense amplifier 504, column decoder/bit line driver 506, row decoder/word line driver 508, voltage generator 510, control logic unit 512, register 514, interface 516 and data bus 518. It should be understood that in some examples, additional peripheral circuits not shown in FIG. 5 may also be included.

The page buffer/sense amplifier 504 may be configured to read data from and write (also referred to as program) data to the array of memory cells 301 according to control signals from the control logic unit 512. In one example, the page buffer/sense amplifier 504 may store a page of program data to be programmed into one page 320 of the array of memory cells 301. In another example, page buffer/sense amplifier 504 may perform a programming verify operation to ensure that data has been correctly programmed into memory cell 306 coupled to selected word line 318. In yet another example, page buffer/sense amplifier 504 may also sense a low power signal from bit line 316 representing a data bit stored in memory cell 306 and amplify a small voltage swing to a recognizable logic level during a read operation. The column decoder/bit line driver 506 may be configured to be controlled by control logic unit 512 and to select one or more memories strings 308 through applying a bit line voltage generated from voltage generator 510.

The row decoder/word line driver 508 may be configured to be controlled by control logic unit 512 and select/deselect memory block 304 of the array of memory cells 301 and select/deselect word line 318 of memory block 304. Row decoder/word line driver 508 may also be configured to drive word line 318 with a word line voltage generated from voltage generator 510. In some implementations, the row decoder/word line driver 508 may also select/deselect and drive the bottom selected line 315 and the top selected line 313. As described in detail below, the row decoder/word line driver 508 is configured to perform programming operations on the memory cells 306 coupled to the selected word line 318. The voltage generator 510 may be configured to be controlled by the control logic unit 512, and generate word line voltage (e.g., read voltage, programming voltage, pass voltage, local voltage, verify voltage, etc.), bit line voltage and source line voltage to be supplied to the array of memory cells 301.

The control logic unit 512 may be coupled to each of the peripheral circuits described above and configured to control operations of each of the peripheral circuits. The register 514 may be coupled to the control logic unit 512 and include status register, command register and address register for storing status information, command operation code (OP code) and command address for controlling operations of each of the peripheral circuits. The interface 516 may be coupled to control logic unit 512 and act as a control buffer to buffer and relay control commands received from a host (not shown) to control logic unit 512 and to buffer and relay status information received from the control logic unit 512 to the host. The interface 516 may also be coupled to column decoder/bit line driver 506 via data bus 518 and act as a data I/O interface and data buffer to buffer and relay data to/from the array of memory cells 301.

Increased erase and write times, aging of memory cells, electron loss from memory cells due to long storage time, threshold voltage forfsets due to high read times, interference between memory cells, write errors, etc., will all lead to read errors, causing the reliability of the data stored in the memory being affected. In order to enhance the reliability of data, LDPC technology with stronger error correction capabilities is employed to ensure that data can be written or read correctly.

LDPC includes Hard Decode and Soft Decode, and soft decode has more advantages over hard decode. However, in the process of soft decode, multiple iterative calculations are required to find the valley, which not only wastes read time, but also often causes errors.

Based on one or more of the problems described above, an example of the present disclosure provides a method for operating a memory.

Figure 6:
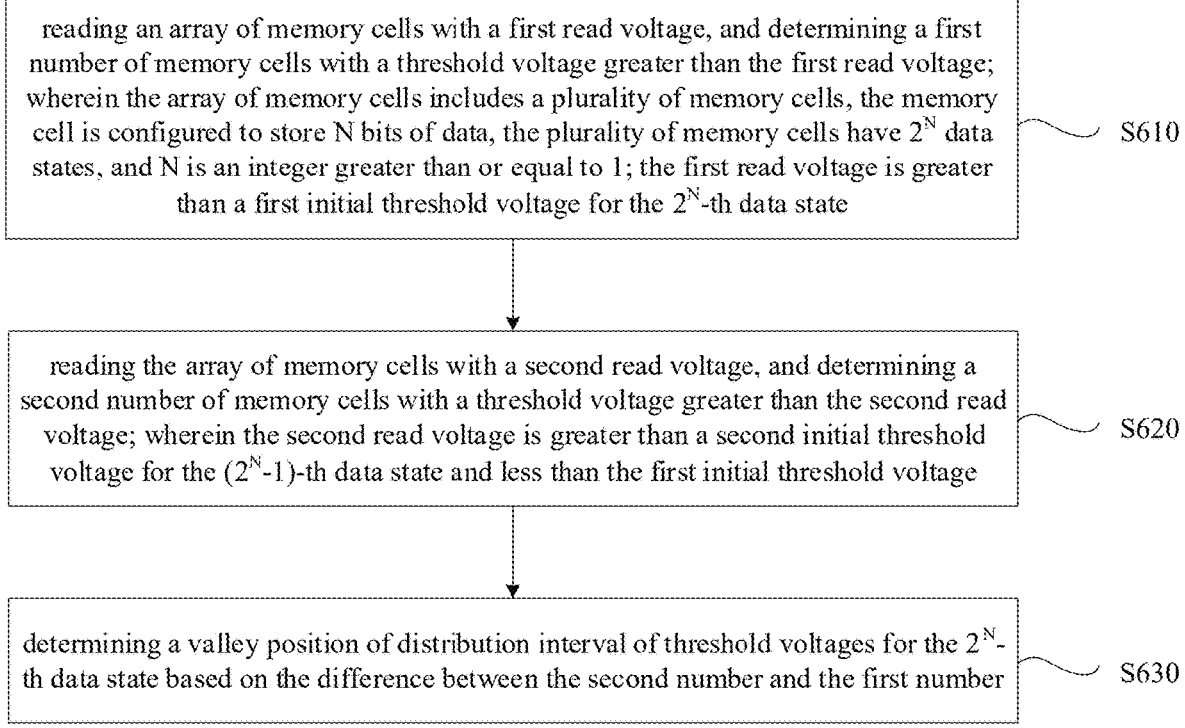
FIG. 6 is a flowchart of a method for operating a memory shown according to an example of the present disclosure.

FIG. 6 is a flowchart of a method for operating a memory shown according to an example of the present disclosure. As shown in FIG. 6, the method at least includes the following operations:

S610: reading an array of memory cells with a first read voltage, and determining a first number of memory cells with a threshold voltage greater than the first read voltage; wherein the array of memory cells includes a plurality of memory cells, the memory cell is configured to store N bits of data, the plurality of memory cells have $2^N$ data states, and N is an integer greater than or equal to 1; the first read voltage is greater than a first initial threshold voltage for the $2^N$-th data state;

S620: reading the array of memory cells with a second read voltage, and determining a second number of memory cells with a threshold voltage greater than the second read voltage; wherein the second read voltage is greater than a second initial threshold voltage for the $(2^N-1)$-th data state and less than the first initial threshold voltage;

S630: determining a valley position of distribution interval of threshold voltages for the $2^N$-th data state based on the difference between the second number and the first number.

In this example, the memory includes SLC memory, MLC memory, TLC memory or QLC memory, etc.; wherein, one memory cell of SLC memory stores 1 bit of data, and multiple SLC memory cells have 2 data states; one memory cell of MLC memory stores 2 bits of data, and multiple MLC memory cells have 4 data states; one memory cell of TLC memory stores 3 bits of data, and multiple TLC memory cells have 8 data states; one memory cell of QLC memory stores 4 bits of data, and multiple QLC memory cells have 16 data states. For case of understanding, TLC memory will be taken as an example for description below.

Figure 7:
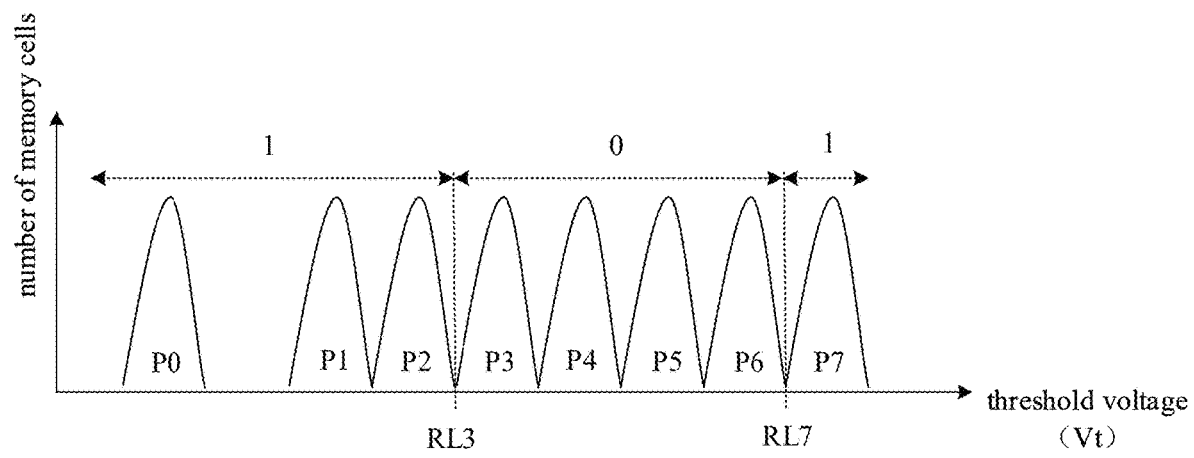
FIG. 7 is a schematic diagram 1 of the threshold voltage distribution of a memory shown according to an example of the present disclosure.

A TLC memory has 8 data states; wherein 1 data state is an erase state and 7 data states are program states, the erase state is labeled as P0, and the program states from the 1st state to the 7th state are labeled as P1, P2, P3, P4, P5, P6 and P7, it may be understood that from the P0 state to the P7 state, the threshold voltages gradually increase, as shown in FIG. 7, FIG. 7 shows the threshold voltages for the P0 state to the P7 state without offset, and for the sake of simplicity, the threshold voltages for the P7 state and the P6 state without offset are denoted as the first initial threshold voltage and the second initial threshold voltage respectively.

Figure 8:
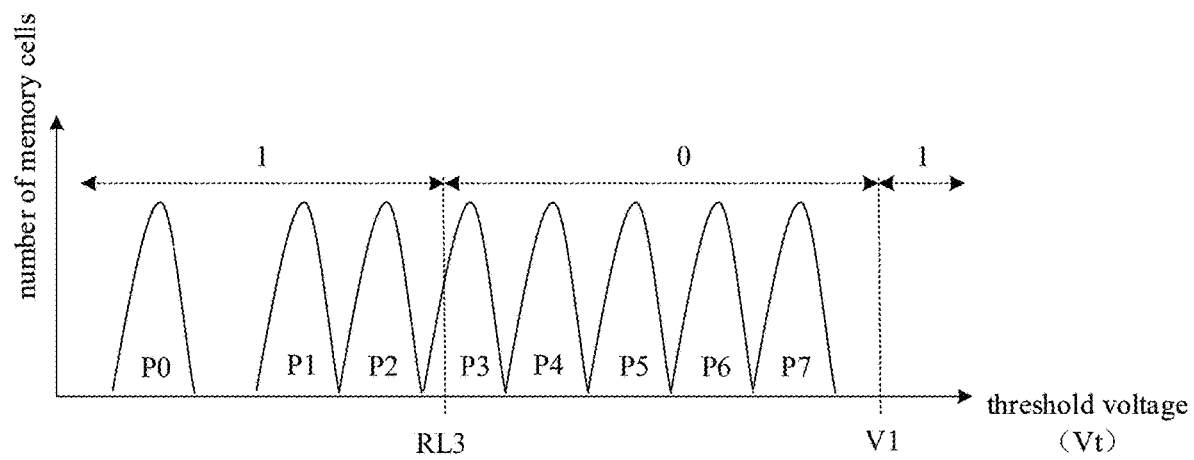
FIG. 8 is a schematic diagram 2 of the threshold voltage distribution of a memory shown according to an example of the present disclosure.

It should be noted that the above-mentioned increase of erase and write times, aging of memory cells, electron loss from memory cells due to long storage time, great read times, interference between memory cells, write errors, etc., will all cause the initial threshold voltage for at least one of the multiple data states to offset, resulting in read errors, e.g., FIG. 8 shows the threshold voltages for the P0 state to the P7 state after offset. Therefore, it is required to find a valley position of the distribution interval of threshold voltages for the offset data state. Here, the valley refers to the minimum number of memory cells corresponding to the threshold voltage distribution of the data state, i.e., the minimum value of the threshold voltages for the data state.

In one example, in operation S610, the array of memory cells is read with a first read voltage, and the first read voltage is greater than the first initial threshold voltage for the P7 state, thereby determining a first number Cnt1 of memory cells with a threshold voltage greater than the first read voltage. For example, the read operation is performed with the first read voltage V1 shown in FIG. 8, thereby determining that the first number Cnt1 is 0, i.e., the threshold voltages for the P0 state to the P7 state are all less than the first read voltage. In practical applications, the threshold voltage is usually not a fixed value, but a range. Therefore, the first read voltage V1 may be set to a maximum value greater than the first initial threshold voltage.

In one example, in operation S620, the array of memory cells is read with a second read voltage, and the second read voltage is greater than the second initial threshold voltage for the P6 state and less than the first initial threshold voltage for the P7 state, thereby determining a second number Cnt1 of memory cells with a threshold voltage greater than the second read voltage. For example, the read operation is performed with the second read voltage V2 shown in FIG. 9, thereby determining the second number Cnt2 (as shown in the shaded portion in FIG. 9), here, the second number Cnt2 is less than the number of memory cells in the P7 state. In an example, the second read voltage V2 may be RL7 shown in FIG. 7, and RL7 may be a default read voltage for distinguishing the second initial threshold voltage from the first initial threshold voltage, e.g., RL7 is 0V.

In one example, in operation S630, the valley position of the distribution interval of threshold voltages for the P7 state is determined based on the difference between the second number Cnt2 and the first number Cnt1. For example, based on Cnt2-Cnt1, it is determined that the P7 state offsets left, and the valley of the threshold voltage for the P7 state is located on the left side of the second read voltage V2.

In practical applications, when the threshold voltage for the read memory cell is greater than the first read voltage, a first logic value may be output; when the threshold voltage for the read memory cell is less than or equal to the first read voltage, a second logic value may be output; the first number Cnt1 may be determined by counting the number of first logical values and/or second logical values, the first logical value may be one of the logical values "1" or "0" and the second logical value may be the other one of the logical values "1" or "0". The statistical way of the second number Cnt2 may be similar to the statistical way of the first number Cnt1, and which, for the sake of simplicity, will not be repeated here.

In an example of the present disclosure, an array of memory cells is read with a first read voltage, a first number of memory cells with a threshold voltage greater than the first read voltage is determined; an array of memory cells is read with a second read voltage, a second number of memory cells with a threshold voltage greater than the second read voltage is determined; and a valley position of distribution interval of threshold voltages for the $2^N$-th data state is determined based on the difference between the second number and the first number. In a first aspect, the valley position for the $2^N$ data state may be quickly found, thereby reducing the number of adjustments to the read voltage and in turn reducing the read time; in a second aspect, the probability of errors may be reduced and the error correction capability of LDPC may be improved.

In some examples, the operation S630 described above includes: determining the difference between the second number and the first number; determining whether the difference is substantially equal to a preset value; wherein the preset value is the number of memory cells in the $2^N$-th data state; when the difference is substantially equal to the preset value, determining that the valley position is between the second read voltage and the first initial threshold voltage.

In some examples, when the difference is less than the preset value, determining that the valley position is between the second initial threshold voltage and the second read voltage.

In one example, when the difference between the second number Cnt2 and the first number Cnt1 is based on the number of memory cells in the P7 state, determining that the valley of the threshold voltage for the P7 state is between the second read voltage and the first initial threshold voltage. In an example, the valley of the threshold voltage for the P7 state is located between the second read voltage and the minimum value of the first initial threshold voltages. Here, this is substantially equivalent to including: the difference between the second number Cnt2 and the first number Cnt1 is completely equal to the number of memory cells in the P7 state; or absolute value of the difference between the difference between the second number Cnt2 and the first number Cnt1 and the number of memory cells in the P7 state is within an allowable error range.

Figure 9:
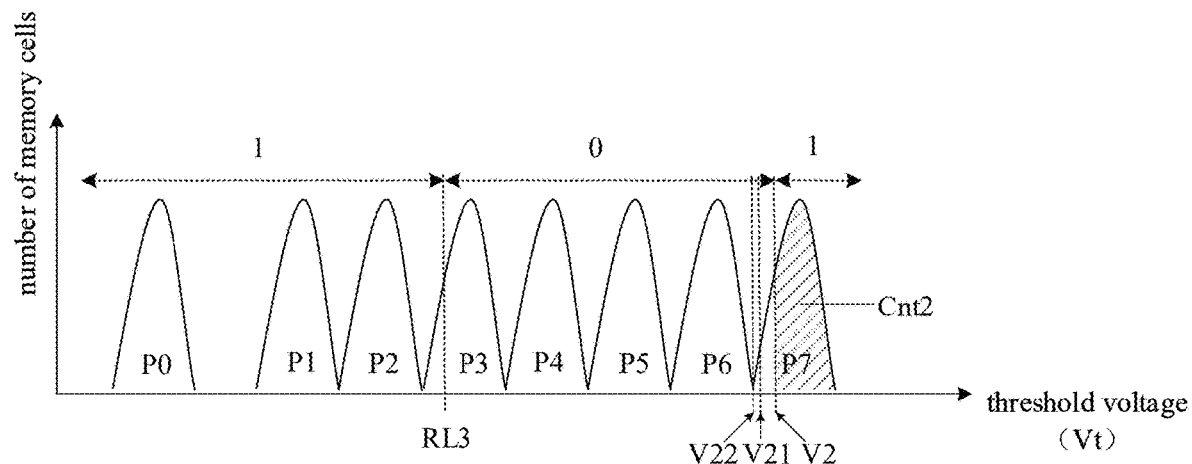
FIG. 9 is a schematic diagram 3 of the threshold voltage distribution of a memory shown according to an example of the present disclosure.

In one example, when the difference between the second number Cnt2 and the first number Cnt1 is less than the number of memory cells in the P7 state, determining that the valley of the threshold voltage for the P7 state is between the second initial threshold voltage and the second read voltage, as shown in FIG. 9. In an example, the valley of the threshold voltage for the P7 state is located between the maximum value of the second initial threshold voltage and the second read voltage.

It may be understood that after a plurality of memory cells are respectively programmed to P1 state to P7 state, the number of memory cells corresponding to each data state is determined. For example, the number of memory cells in the P7 state may be the integral of the threshold voltage distribution curve for the P7 state in FIG. 7 (i.e., a preset value).

In an example of the present disclosure, the difference between the second number and the first number is determined, and the difference is compared with the number of memory cells in the $2^N$-th data state; when the difference is substantially equal to the number of memory cells in the $2^N$-th data state, determining that the valley position for the $2^N$-th data state is between the second read voltage and the first initial threshold voltage; when the difference is less than the number of memory cells in the $2^N$-th data state, determining that the valley position for the $2^N$-th data state is between the second initial threshold voltage and the second read voltage; thereby the valley position for the $2^N$-th data state may be determined quickly and efficiently.

In some examples, the method described above further includes: when the difference is less than the preset value, reading the array of memory cells with at least one offset read voltage until a difference between the number of memory cells with a threshold voltage greater than the offset read voltage and the first number is substantially equal to the preset value; wherein the offset read voltage offsets relative to the second read voltage, and the offset read voltage is greater than the second initial threshold voltage and less than the second read voltage.

In one example, after the array of memory cells is read with the second read voltage V2 shown in FIG. 9, at least one offset read voltage may be generated based on the second read voltage V2, and the offset read voltage offsets left relative to the second read voltage V2, i.e., the offset read voltage is less than the second read voltage V2, by continuing to read the array of memory cells with the offset read voltage, the valley position of the distribution interval of threshold voltages for the P7 state may be further accurately found.

In this example, the default read voltage may be offset to obtain at least one offset read voltage, and the array of memory cells may be read with the offset read voltage until the difference between the number of memory cells with a threshold voltage greater than the offset read voltage and the first number is substantially equal to the number of memory cells in the P7 state, thereby the valley position of the distribution interval of threshold voltages for the P7 state may be accurately found, thus assisting in finding the valley positions of the distribution intervals of threshold voltages for other data states (e.g., P1 state to P6 state) after offset.

In some examples, the at least one offset read voltage includes a first offset read voltage and a second offset read voltage, the second offset read voltage is less than the first offset read voltage; and the method described above further includes:

generating the first offset read voltage based on the second read voltage; wherein the first offset read voltage has a first offset relative to the second read voltage; generating the second offset read voltage based on the first offset read voltage; wherein, the second offset read voltage has a second offset relative to the first offset read voltage, and the second offset is less than or equal to the first offset.

In one example, referring to FIG. 9, the first offset read voltage V21 is generated based on the second read voltage V2; the array of memory cells is read with the first offset read voltage V21, the first offset read voltage V21 is greater than the second initial threshold voltage and less than the second read voltage V2; a third number of memory cells with a threshold voltage greater than the first offset read voltage V21 is determined, at this time, the third number is still less than the number of memory cells in the P7 state, therefore the read voltage is required to continue to be offset left to accurately find the valley position of the threshold voltages for the P7 state. In this example, the first offset read voltage V21 may be set to a value greater than the maximum value of the second initial threshold voltages.

In one example, referring to FIG. 9, the second offset read voltage V22 is generated based on the first offset read voltage V21; the array of memory cells is read with the second offset read voltage V22, the second offset read voltage V22 is greater than the second initial threshold voltage and less than the first offset read voltage V21; a fourth number of memory cells with a threshold voltage greater than the second offset read voltage V22 is determined, at this time, the fourth number is substantially equal to the number of memory cells in the P7 state, thereby accurately finding the valley position of the threshold voltages in the P7 state. In this example, the second offset read voltage V1 may be set to a value greater than the maximum values of the second initial threshold voltages.

It may be noted that in the case described above where a plurality of different offset read voltages (e.g., a first offset read voltage V21 and a second offset read voltage V22) are generated based on the second read voltage, when the valley position of the threshold voltages for the P7 state still may not be found with the first offset read voltage V21, the offset of the voltage may be reduced, i.e., the second offset is less than the first offset, to facilitate a more accurate search. Of course, in other examples, the second offset may be equal to the first offset.

In an example of the present disclosure, the first offset read voltage is generated based on the second read voltage, the first offset read voltage has a first offset relative to the second read voltage; the second offset read voltage is generated based on the first offset read voltage, the second offset read voltage has a second offset relative to the first offset read voltage, and the second offset is less than or equal to the first offset; By adjusting the offset of the read voltage, the valley position of the distribution interval of threshold voltages after offset of the $2^N$-th data state may be quickly and accurately found, thus assisting in finding the valley positions of the distribution intervals of threshold voltages for other data states after offset.

In other examples, the first offset read voltage may be greater than the minimum value of the second initial threshold voltages and less than or equal to the maximum value of the second initial threshold voltages.

Figure 10:
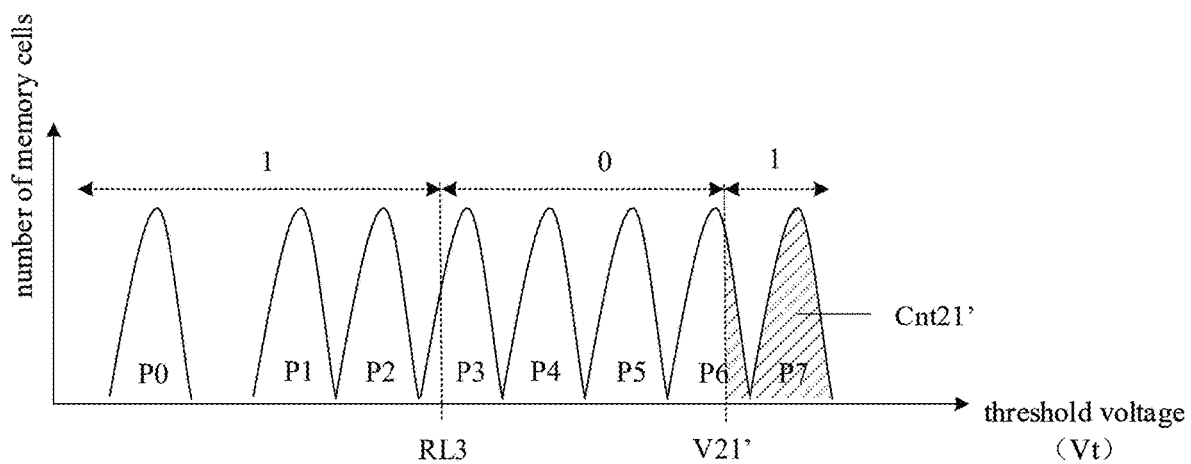
FIG. 10 is a schematic diagram 4 of the threshold voltage distribution of a memory shown according to an example of the present disclosure.

In one example, referring to FIG. 10, the first offset read voltage V21' is generated based on the second read voltage V2; the array of memory cells is read with the first offset read voltage V21', the first offset read voltage V21' is greater than the minimum value of the second initial threshold voltages and less than the maximum value of the second initial threshold voltages; a third number Cnt21' (as shown in the shaded portion in FIG. 10) of memory cells with a threshold voltage greater than the first offset read voltage V21' is determined, at this time, the third number is greater than the number of memory cells in the P7 state, and the offset of the read voltage is too large, therefore the read voltage is required to be offset right to accurately find the valley position of the threshold voltages for the P7 state.

Figure 11:
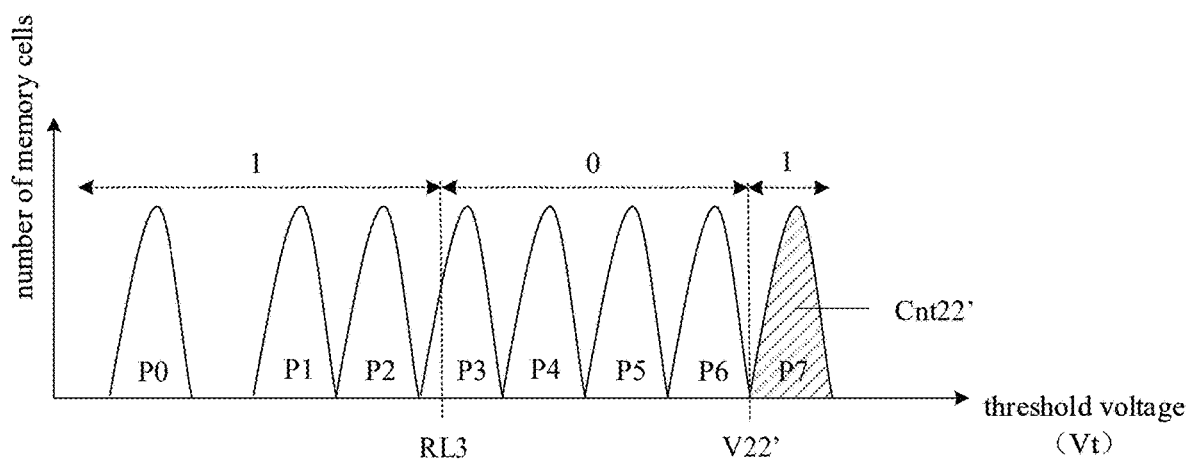
FIG. 11 is a schematic diagram 5 of the threshold voltage distribution of a memory shown according to an example of the present disclosure.

In one example, referring to FIG. 11, the second offset read voltage V22' is generated based on the first offset read voltage V21'; the array of memory cells is read with the second offset read voltage V22', a fourth number Cnt22' (as shown in the shaded portion in FIG. 11) of memory cells with a threshold voltage greater than the second offset read voltage V22' is determined, at this time, the fourth number Cnt22' is substantially equal to the number of memory cells in the P7 state, thereby accurately finding the valley position of the threshold voltages in the P7 state.

In practical applications, the offset of the read voltage may be reasonably adjusted according to the result of each reading, so as to quickly and accurately find the valley position of the highest distribution interval of threshold voltages.

In some examples, the number of memory cells in the $2^N$-th data state includes a ratio of the total number of the plurality of memory cells and $2^N$. In this example, a plurality of memory cells have 8 data states, and the number of memory cells in each data state may be the same, e.g., the number of memory cells in any one of the data states from P0 state to P7 state may be ⅛ of the total number of the plurality of memory cells. Of course, in other examples, the number of memory cells in any two data states from the P0 state to the P7 state may be different.

In practical applications, after programming is completed, a read operation may be performed on the array of memory cells to obtain the threshold voltage distribution shown in FIG. 7, thereby determining the number of memory cells in each data state. Here, the number of memory cells in each data state is the integral of the threshold voltage distribution curve of the data state.

In some examples, the method described above further includes: determining the optimal read voltage that distinguishes the $(2^N-1)$-th data state from the $2^N$-th data state based on the valley position. In one example, referring to FIG. 9, the second offset read voltage V22 may be determined as the optimal read voltage, thereby accurately distinguishing the threshold voltages of the P6 state from the P7 state after the offset.

In some examples, the method described above further includes: performing a write operation on the array of memory cells, so that a plurality of memory cells have the $2^N$ data states; determining the first initial threshold voltage and the second initial threshold voltage based on the $2^N$ data states.

Figure 12:
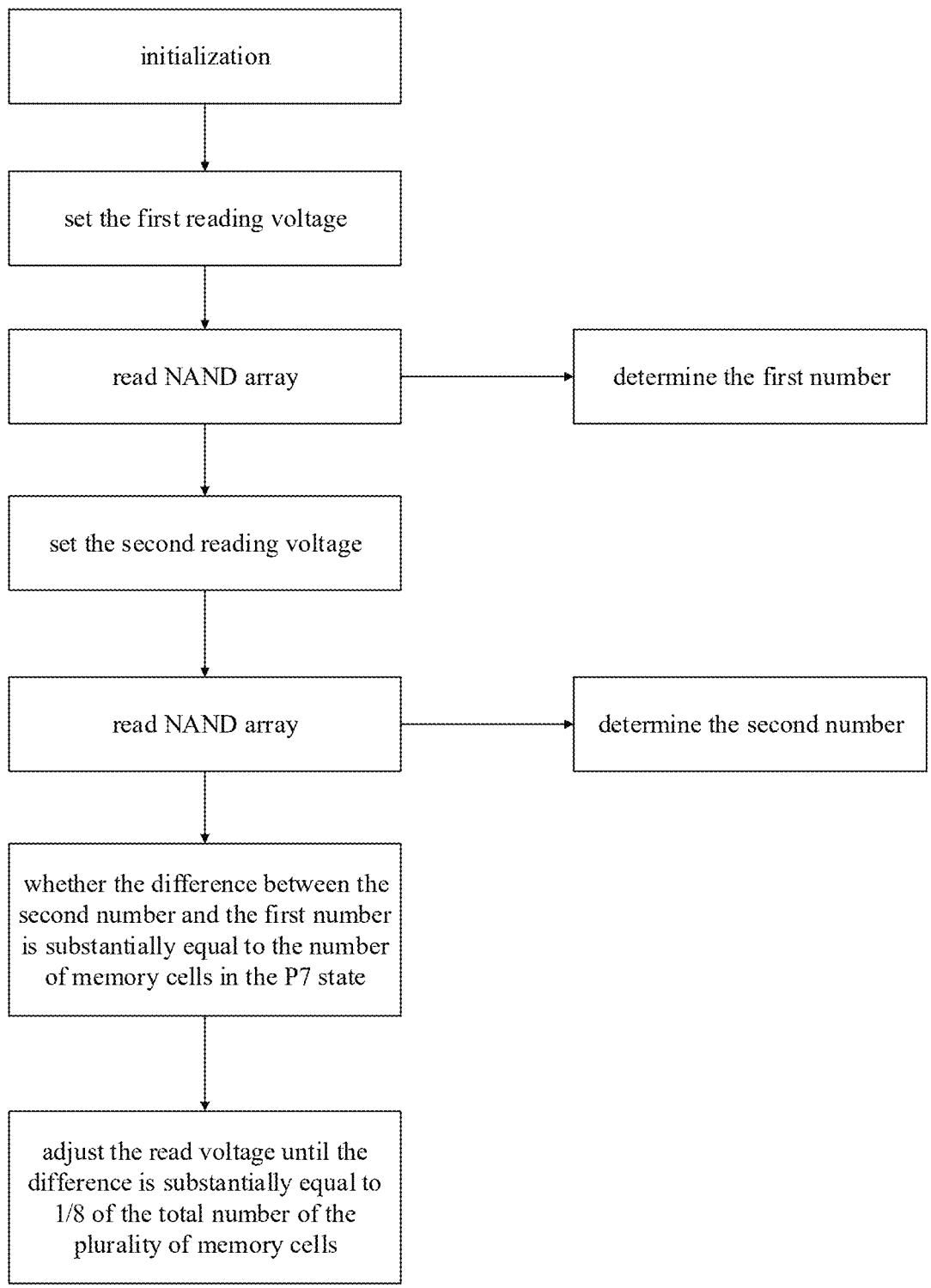
FIG. 12 is a flow chart for finding the valley position for P7 state shown according to an example of the present disclosure.

FIG. 12 is a flow chart for finding the valley position for P7 state shown according to an example of the present disclosure. Referring to FIG. 12, in some examples, it includes: initialization; the read voltage is set to the first read voltage, and the first read voltage may be greater than a maximum value of the initial threshold voltages for the P7 state; a NAND array is read with the first read voltage, a first number of memory cells with a threshold voltage greater than the first read voltage is determined, the first number may be 0; the read voltage is set to a second read voltage, the second read voltage may be a default read voltage for distinguishing the initial threshold voltage for the P6 state from the initial threshold voltage for the P7 state, e.g., 0V; a NAND array is read with a second read voltage, a second number of memory cells with a threshold voltage greater than the second read voltage is determined; and it is determined whether the difference between the second number and the first number is substantially equal to the number of memory cells in the P7 state, and if the difference is less than the number of memory cells in the P7 state, the read voltage continues to be adjusted until the difference is substantially equal to ⅛ of the total number of the plurality of memory cells, thereby determining the valley position for the P7 state; and if the difference is substantially equal to the number of memory cells in the P7 state, the valley position for the P7 state is directly determined without further adjustment of the read voltage. In this example, the number of memory cells in the P7 state is ⅛ of the total number of the plurality of memory cells.

Based on the method for operating a memory described above, an example of the present disclosure further provides a memory system, including:
an array of memory cells, wherein the array of memory cells includes a plurality of memory cells, the memory cell is configured to store N bits of data, the plurality of memory cells have $2^N$ data states, and N is an integer greater than or equal to 1;
peripheral circuit, coupled to the array of memory cells, the peripheral circuit is configured to:
read the array of memory cells with a first read voltage, and determine a first number of memory cells with a threshold voltage greater than the first read voltage; wherein the first read voltage is greater than a first initial threshold voltage for the $2^N$-th data state;
read the array of memory cells with a second read voltage, and determine a second number of memory cells with a threshold voltage greater than the second read voltage; wherein the second read voltage is greater than a second initial threshold voltage for the $(2^N-1)$-th data state and less than the first initial threshold voltage;
determine a valley position of distribution interval of threshold voltages for the $2^N$-th data state based on the difference between the second number and the first number.

In some examples, the peripheral circuit is configured to:
determine the difference between the second number and the first number;
determine whether the difference is substantially equal to a preset value; wherein the preset value is the number of memory cells in the $2^N$-th data state;
when the difference is substantially equal to the preset value, determine that the valley position is between the second read voltage and the first initial threshold voltage.

In some examples, the peripheral circuit is configured to:
when the difference is less than the preset value, determine that the valley position is between the second initial threshold voltage and the second read voltage.

In some examples, the peripheral circuit is further configured to:
when the difference is less than the preset value, read the array of memory cells with at least one offset read voltage until a difference between the number of memory cells with a threshold voltage greater than the offset read voltage and the first number is substantially equal to the preset value; wherein the offset read voltage offsets relative to the second read voltage, and the offset read voltage is greater than the second initial threshold voltage and less than the second read voltage.

In some examples, the at least one offset read voltage includes a first offset read voltage and a second offset read voltage, the second offset read voltage is less than the first offset read voltage; and the peripheral circuit is further configured to:
generate the first offset read voltage based on the second read voltage; wherein the first offset read voltage has a first offset relative to the second read voltage;
generate the second offset read voltage based on the first offset read voltage; wherein, the second offset read voltage has a second offset relative to the first offset read voltage, and the second offset is less than or equal to the first offset.

In some examples, the number of memory cells in the $2^N$-th data state includes a ratio of the total number of the plurality of memory cells and $2^N$.

In some examples, the peripheral circuit is configured to:
determine the optimal read voltage that distinguishes the $(2^N-1)$-th data state from the $2^N$-th data state based on the valley position.

In some examples, the peripheral circuit is further configured to:
perform a write operation on the array of memory cells, so that a plurality of memory cells have the $2^N$ data states;
determine the first initial threshold voltage and the second initial threshold voltage based on the $2^N$ data states.

In some examples, the memory includes a flash memory.

Here, regarding the structure and composition of the memory, reference may be made to the aforementioned detailed introduction of FIGS. 3, 4, and 5, and other details about the memory are similar to those in the aforementioned operating method for memory, which, for the sake of brevity, will not be repeated here.

Based on the memory described above, an example of the present disclosure further provides a memory system, including:

one or more memories of any one of the examples described above;
a memory controller coupled to the memory and configured to control the memory.

Here, regarding the structure and composition of the memory system, reference may be made to the aforementioned detailed introduction of FIGS. 1, 2a, 2b, 3, 4, and 5, and other details about the memory system are similar to those aforementioned, which, for the sake of brevity, will not be repeated here.

An example of the present disclosure also provides a computer-readable storage medium, instructions are stored thereon, and the instructions, when executed, implement the operating method of any one of the examples described above.

Here, implementing all or part of the processes in the example methods described above may be accomplished through computer program indicating relevant hardware, the computer program may be stored in a computer-readable storage medium, and the execution of the computer program may include the process of examples of the methods described above. Wherein the storage medium may be a magnetic disk, optical disk, read-only memory (ROM), Random Access Memory (RAM), Flash Memory, Hard Disk Drive (HDD) or solid state drive, etc., the storage medium may also include combinations of memories of the types described above.

The methods disclosed in several method examples provided in the present disclosure may be combined arbitrarily without conflicts to obtain new method examples.

The features disclosed in several apparatus examples provided in the present disclosure may be combined arbitrarily without conflicts to obtain new apparatus examples.

It should be understood that reference throughout the description to "one example" or "an example" means that a particular feature, structure or characteristic related to the example is included in at least one example of the present disclosure. Thus, appearances of "in one example" or "in an example" in various places throughout the description are not necessarily referring to a same example. Furthermore, these particular features, structures or characteristics may be combined in any appropriate manner in one or more examples. It should be understood that in various examples of the present disclosure, sequence numbers of the processes described above do not mean the execution order, and the execution order of each process should be determined by its function and internal logic, and should not constitute any limitation to implementation process of examples of the present disclosure. The serial numbers of examples of the present disclosure described above are for the purpose of description only, and do not represent the advantages and disadvantages of the examples.

It should be noted that, in this description, the terms "including", "containing" or any other variations thereof are intended to cover a non-exclusive inclusion, such that a process, method, article or device that includes a series of elements includes not only those elements but also other elements not expressly listed or that are inherent to the process, method, article or device. Without further limitation, an element defined by the statement "including a . . . " does not exclude the presence of additional identical elements in a process, method, article, or device that includes that element.

The above is only implementations of the present disclosure, but the claimed scope of the present disclosure is not limited thereto, and changes or substitutions within the technical scope disclosed in the present disclosure that may be easily conceived by those skilled in the art shall fall within the claimed scope of the present disclosure. Therefore, the claimed scope of the present disclosure should be determined by the claimed scope of the claims.

What is claimed is:

1. A memory, comprising:
an array of memory cells comprising a plurality of memory cells, wherein a memory cell is configured to store N bits of data, and the plurality of memory cells have $2^N$ data states, where N is an integer greater than or equal to 1; and
a peripheral circuit coupled to the array of memory cells and configured to:
read the array of memory cells with a first read voltage, and determine a first number of memory cells with a threshold voltage greater than the first read voltage, wherein the first read voltage is greater than a first initial threshold voltage for a $2^N$-th data state;
read the array of memory cells with a second read voltage, and determine a second number of memory cells with a threshold voltage greater than the second read voltage, wherein the second read voltage is greater than a second initial threshold voltage for a $(2^N-1)$-th data state and less than the first initial threshold voltage; and
determine a valley position of distribution interval of threshold voltages for the $2^N$-th data state based on a difference between the second number and the first number.

2. The memory of claim 1, wherein the peripheral circuit is configured to:
determine the difference between the second number and the first number;
determine whether the difference is substantially equal to a preset value, wherein the preset value is a number of memory cells in the $2^N$-th data state; and
when the difference is substantially equal to the preset value, determine that the valley position is between the second read voltage and the first initial threshold voltage.

3. The memory of claim 2, wherein the peripheral circuit is configured to:
when the difference is less than the preset value, determine that the valley position is between the second initial threshold voltage and the second read voltage.

4. The memory of claim 2, wherein the peripheral circuit is further configured to:
when the difference is less than the preset value, read the array of memory cells with at least one offset read voltage until a difference between the number of memory cells with a threshold voltage greater than the offset read voltage and the first number is substantially equal to the preset value; wherein the offset read voltage offsets relative to the second read voltage, and the offset read voltage is greater than the second initial threshold voltage and less than the second read voltage.

5. The memory of claim 4, wherein the at least one offset read voltage includes a first offset read voltage and a second offset read voltage, and the second offset read voltage is less than the first offset read voltage, and
wherein the peripheral circuit is further configured to:
generate the first offset read voltage based on the second read voltage, wherein the first offset read voltage has a first offset relative to the second read voltage; and
generate the second offset read voltage based on the first offset read voltage; wherein the second offset read voltage has a second offset relative to the first offset read voltage, and the second offset is less than or equal to the first offset.

6. The memory of claim 2, wherein the number of memory cells in the $2^N$-th data state includes a ratio of a total number of the plurality of memory cells and $2^N$.

7. The memory of claim 1, wherein the peripheral circuit is configured to:
 determine an optimal read voltage that distinguishes the $(2^N-1)$-th data state from the $2^N$-th data state based on the valley position.

8. The memory of claim 1, wherein the peripheral circuit is further configured to:
 perform a write operation on the array of memory cells, so that the plurality of memory cells have the $2^N$ data states; and
 determine the first initial threshold voltage and the second initial threshold voltage based on the $2^N$ data states.

9. The memory of claim 1, wherein the memory includes a flash memory.

10. A method for operating a memory, comprising:
 reading an array of memory cells with a first read voltage, and determining a first number of memory cells with a threshold voltage greater than the first read voltage, wherein the array of memory cells includes a plurality of the memory cells, a memory cell is configured to store N bits of data, the plurality of memory cells have $2^N$ data states, N is an integer greater than or equal to 1, and the first read voltage is greater than a first initial threshold voltage for a $2^N$-th data state;
 reading the array of memory cells with a second read voltage, and determining a second number of memory cells with a threshold voltage greater than the second read voltage, wherein the second read voltage is greater than a second initial threshold voltage for a $(2^N-1)$-th data state and less than the first initial threshold voltage; and
 determining a valley position of distribution interval of threshold voltages for the $2^N$-th data state based on a difference between the second number and the first number.

11. The method of claim 10, wherein the determining a valley position of distribution interval of threshold voltages for the $2^N$-th data state based on a difference between the second number and the first number includes:
 determining the difference between the second number and the first number;
 determining whether the difference is substantially equal to a preset value; wherein the preset value is the number of memory cells in the $2^N$-th data state; and
 when the difference is substantially equal to the preset value, determining that the valley position is between the second read voltage and the first initial threshold voltage.

12. The method of claim 11, wherein, when the difference is less than the preset value, the method comprises: determining that the valley position is between the second initial threshold voltage and the second read voltage.

13. The method of claim 11, further comprising:
 when the difference is less than the preset value, reading the array of memory cells with at least one offset read voltage until a difference between the number of memory cells with a threshold voltage greater than the offset read voltage and the first number is substantially equal to the preset value,
 wherein the offset read voltage offsets relative to the second read voltage, and the offset read voltage is greater than the second initial threshold voltage and less than the second read voltage.

14. The method of claim 13, wherein the at least one offset read voltage includes a first offset read voltage and a second offset read voltage, and the second offset read voltage is less than the first offset read voltage, and
 wherein the method further includes:
 generating the first offset read voltage based on the second read voltage, wherein the first offset read voltage has a first offset relative to the second read voltage; and
 generating the second offset read voltage based on the first offset read voltage, wherein the second offset read voltage has a second offset relative to the first offset read voltage, and the second offset is less than or equal to the first offset.

15. The method of claim 11, wherein the number of memory cells in the $2^N$-th data state includes a ratio of a total number of the plurality of memory cells and $2^N$.

16. The method of claim 10, further includes:
 determining an optimal read voltage that distinguishes the $(2^N-1)$-th data state from the $2^N$-th data state based on the valley position.

17. The method of claim 10, further includes:
 performing a write operation on the array of memory cells, so that the plurality of memory cells have the $2^N$ data states; and
 determining the first initial threshold voltage and the second initial threshold voltage based on the $2^N$ data states.

18. A memory system, comprising:
 one or more memories, each of the one or more memories comprising:
 an array of memory cells comprising a plurality of memory cells, the memory cell is configured to store N bits of data, the plurality of memory cells have $2^N$ data states, and N is an integer greater than or equal to 1;
 a peripheral circuit coupled to the array of memory cells and configured to:
 read the array of memory cells with a first read voltage, and determine a first number of memory cells with a threshold voltage greater than the first read voltage, wherein the first read voltage is greater than a first initial threshold voltage for a $2^N$-th data state;
 read the array of memory cells with a second read voltage, and determine a second number of memory cells with a threshold voltage greater than the second read voltage, wherein the second read voltage is greater than a second initial threshold voltage for the $(2^N-1$-th data state and less than the first initial threshold voltage; and
 determine a valley position of distribution interval of threshold voltages for the $2^N$-th data state based on a difference between the second number and the first number; and
 a memory controller coupled to the one or more memories and configured to control the one or more memories.

19. The memory system of claim 18, wherein the peripheral circuit is configured to:
 determine the difference between the second number and the first number;
 determine whether the difference is substantially equal to a preset value, wherein the preset value is a number of memory cells in the $2^N$-th data state; and when the difference is substantially equal to the preset value, determine that the valley position is between the second read voltage and the first initial threshold voltage.

20. The memory system of claim 19, wherein the peripheral circuit is configured to:
when the difference is less than the preset value, determine that the valley position is between the second initial threshold voltage and the second read voltage.

* * * * *